(12) United States Patent
Oishi

(10) Patent No.: US 11,500,599 B2
(45) Date of Patent: Nov. 15, 2022

(54) INFORMATION PROCESSING APPARATUS AND METHOD FOR CONTROLLING THE SAME

(71) Applicant: CANON KABUSHIKI KAISHA, Tokyo (JP)

(72) Inventor: Tetsu Oishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/600,972

(22) Filed: Oct. 14, 2019

(65) Prior Publication Data

US 2020/0133601 A1 Apr. 30, 2020

(30) Foreign Application Priority Data

Oct. 31, 2018 (JP) .............................. JP2018-205870

(51) Int. Cl.
*G06F 3/12* (2006.01)

(52) U.S. Cl.
CPC .......... *G06F 3/1258* (2013.01); *G06F 3/1208* (2013.01); *G06F 3/1256* (2013.01); *G06F 3/1275* (2013.01)

(58) Field of Classification Search
USPC ..... 355/22–25, 82; 358/1.1–3.29, 1.11–1.18, 358/527; 345/629–634, 650–655, 345/156–162, 520–533, 214, 901–903, 345/952; 399/361–362, 407–408; 715/201–204, 700–702, 731, 835–841, 715/851–860
See application file for complete search history.

(56) References Cited

U.S. PATENT DOCUMENTS

| 6,999,198 B1 * | 2/2006 | Nakagiri ................. B42C 19/00 358/1.13 |
| 2008/0218776 A1 | 9/2008 | Takami |
| 2010/0003108 A1 * | 1/2010 | Motoyoshi ......... G03G 15/6582 412/37 |
| 2013/0045851 A1 * | 2/2013 | Hori ....................... G06F 3/1204 493/405 |
| 2014/0132978 A1 | 5/2014 | Igawa |
| 2015/0169271 A1 * | 6/2015 | Kikuchi .............. G06F 3/04842 358/1.2 |
| 2016/0361035 A1 * | 12/2016 | Lee ...................... A61B 6/4452 |
| 2016/0378330 A1 * | 12/2016 | Hisada ............... H04N 1/00713 715/863 |
| 2019/0346884 A1 * | 11/2019 | Sepulveda ............ G06F 3/0489 |

FOREIGN PATENT DOCUMENTS

| EP | 1098266 A2 | 5/2001 |
| EP | 2784659 A1 | 10/2014 |
| JP | 2005-141729 A | 6/2005 |
| JP | 2010-57101 A | 3/2010 |
| JP | 2014-191388 A | 10/2014 |

\* cited by examiner

*Primary Examiner* — Marcellus J Augustin
(74) *Attorney, Agent, or Firm* — Canon U.S.A., Inc. IP Division

(57) ABSTRACT

An information processing apparatus displays a setting screen for performing setting for a plurality of setting items for generating a product. The information processing apparatus determines whether a setting item of the plurality of setting items is selected in the setting screen. In a case where the setting item is determined to be selected in the setting screen, an image related to the selected setting item is displayed. In a case where the setting item is determined to be not selected in the setting screen, an image related to the setting item is not displayed.

10 Claims, 22 Drawing Sheets

FIG.6A

| SETTING | DEFAULT VALUE |
|---|---|
| COVER PAPER SIZE (WIDTH) | 210 |
| COVER PAPER SIZE (HEIGHT) | 297 |
| BODY PAPER SIZE (WIDTH) | 165 |
| BODY PAPER SIZE (HEIGHT) | 230 |
| BODY THICKNESS | 12.4 |
| GLUING THICKNESS | 2 |

FIG.6B

| SETTING | ASSIST IMAGE |
|---|---|
| COVER PAPER SIZE (WIDTH) | O |
| COVER PAPER SIZE (HEIGHT) | O |
| BODY PAPER SIZE (WIDTH) | O |
| BODY PAPER SIZE (HEIGHT) | O |
| BODY THICKNESS | O |
| GLUING THICKNESS | O |

FIG.6C

| SETTING | NORMAL PREVIEW | PREVIEW FROM DIFFERENT VIEWPOINT |
|---|---|---|
| COVER PAPER SIZE (WIDTH) | O | × |
| COVER PAPER SIZE (HEIGHT) | O | × |
| BODY PAPER SIZE (WIDTH) | O | O |
| BODY PAPER SIZE (HEIGHT) | O | × |
| BODY THICKNESS | O | O |
| GLUING THICKNESS | × | O |

FIG.6D

| SETTING | DEFAULT VALUE |
|---|---|
| OUTPUT PAPER SIZE (WIDTH) | 329 |
| OUTPUT PAPER SIZE (HEIGHT) | 483 |
| ORIENTATION | WIDTH |
| FINISHING SIZE (WIDTH) | 297 |
| FINISHING SIZE (HEIGHT) | 420 |
| FINISHING ORIENTATION | WIDTH |
| LAYOUT (ROW) | 1 |
| LAYOUT (COLUMN) | 1 |

FIG.6E

| SETTING | ASSIST IMAGE |
|---|---|
| OUTPUT PAPER SIZE (WIDTH) | O |
| OUTPUT PAPER SIZE (HEIGHT) | O |
| ORIENTATION | × |
| FINISHING SIZE (WIDTH) | O |
| FINISHING SIZE (HEIGHT) | O |
| FINISHING ORIENTATION | × |
| LAYOUT (ROW) | × |
| LAYOUT (COLUMN) | × |

FIG.10

|  | PARTS | | | |
| --- | --- | --- | --- | --- |
|  | BODY | COVER | TITLE PAGE | BOOK BAND |
| BASE POINT OF CUT BLOCK: X1 | — | — | — | — |
| BASE POINT OF CUT BLOCK: X2 | — | — | — | — |
| SIZE AFTER CUTTING: WIDTH | — | — | — | — |
| SIZE AFTER CUTTING: HEIGHT | — | — | — | — |
| CREASE 1: X2 | ○ | ○ | ○ | ○ |
| CREASE 1: Y2 | ○ | ○ | ○ | ○ |
| CREASE 2: X3 | ○ | ○ | ○ | ○ |
| CREASE 2: Y3 | ○ | ○ | ○ | ○ |

INFORMATION PROCESSING APPARATUS AND METHOD FOR CONTROLLING THE SAME

BACKGROUND

Field

The present disclosure relates to settings in commercial printing.

Description of the Related Art

In commercial printing, a work flow is generated by assigning parts (cover, body, title page, book band, etc.) required to produce a commercial material (book, flier, card, etc.) and processes (layout, bar code attachment, printing, folding, perfect binding, three-way cutting, etc.) required for each part. An ordered job is automatically processed based on the generated work flow. Commercial material generation software discussed in Japanese Patent Application Laid-Open No. 2014-191388 makes it possible to perform a layout work on a virtual print product in consideration of the form of a print product and a final product.

SUMMARY

Although the conventional commercial material generation software discussed in Japanese Patent Application Laid-Open No. 2014-191388 makes it possible to preview the final product with layout completed, it has now been determined that there can be difficulty in recognizing which setting item corresponds to which setting value in the final product. In particular, conventional commercial printing involves a large number of setting items in each process and has an issue of a user having difficulty in recognizing which setting item is being set for a product.

In consideration of the above-discussed points, the present disclosure features, among other things, offering a technique for making it easier for a user to recognize which setting item is being set for a product when performing setting a plurality of setting items for generating a product.

According to an aspect of the present disclosure, an information processing apparatus includes a display control unit configured to display a setting screen for performing setting for a plurality of setting items for generating a product. The information processing apparatus also includes a determination unit configured to determine whether a setting item of the plurality of setting items is selected in the setting screen. In the setting screen, in a case where the setting item is determined to be selected, an image related to the selected setting item is displayed, and in a case where the setting item is determined to be not selected, the image related to the setting item is not displayed.

Further features of the present disclosure will become apparent from the following description of exemplary embodiments with reference to the attached drawings.

BRIEF DESCRIPTION OF THE DRAWINGS

FIGS. 6A, 6B, 6C, 6D, and 6E illustrate examples of information tables.

FIG. 10 illustrates an example of a related parts information table.

DESCRIPTION OF THE EMBODIMENTS

Exemplary embodiments of the present disclosure will be described below with reference to the accompanying drawings.

Figure 1:
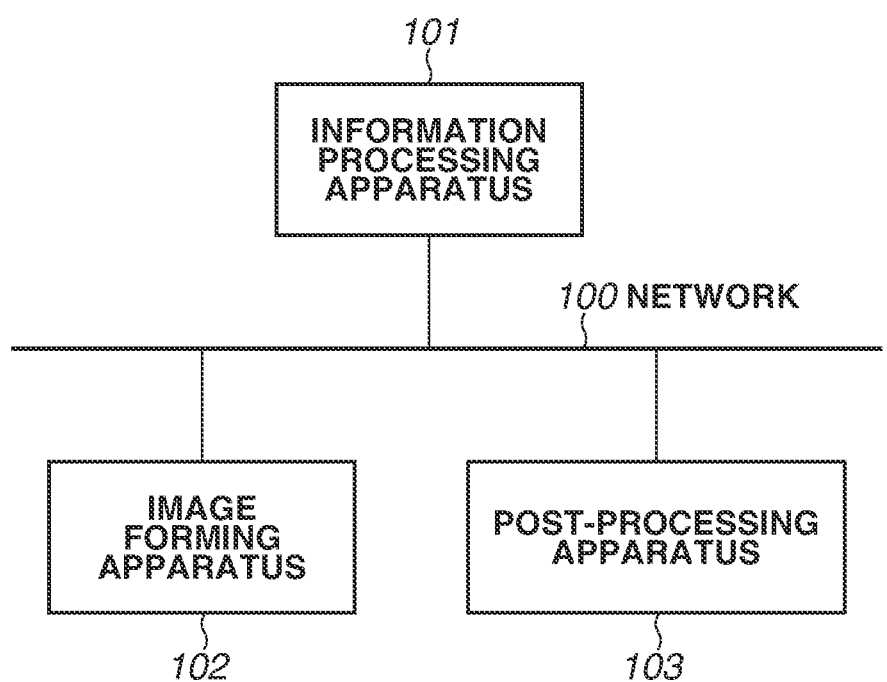
FIG. 1 illustrates a system configuration of the present disclosure.

FIG. 1 illustrates a system configuration according to an exemplary embodiment of the present disclosure. The system configuration according to a first exemplary embodiment includes an information processing apparatus 101, an image forming apparatus 102, and a post-processing apparatus 103. The information processing apparatus 101, the image forming apparatus 102, and the post-processing apparatus 103 are connected with each other via a network 100. The image forming apparatus 102 analyzes print data transmitted from the information processing apparatus 101, converts the print data into a dot image on a per-page basis, and performs printing. A print product output from the image forming apparatus 102 may be manually carried to the post-processing apparatus 103 by an operator or by using a belt conveyor (not illustrated). The post-processing apparatus 103 is capable of communicating with the image forming apparatus 102 and the information processing apparatus 101 via the network 100. The post-processing apparatus 103 processes the transferred print product through cutting, creasing, folding, bookbinding, and perfect binding. It is also possible to perform cutting after book binding by using a plurality of post-processing apparatuses. Although, in FIG. 1, the system configuration includes one information processing apparatus 101, one image forming apparatus 102, and one post-processing apparatus 103, the system may include any number of apparatuses. For example, print products output by a plurality of the image forming apparatuses 102 may be processed by a plurality of post-processing apparatuses 103.

Figure 2:
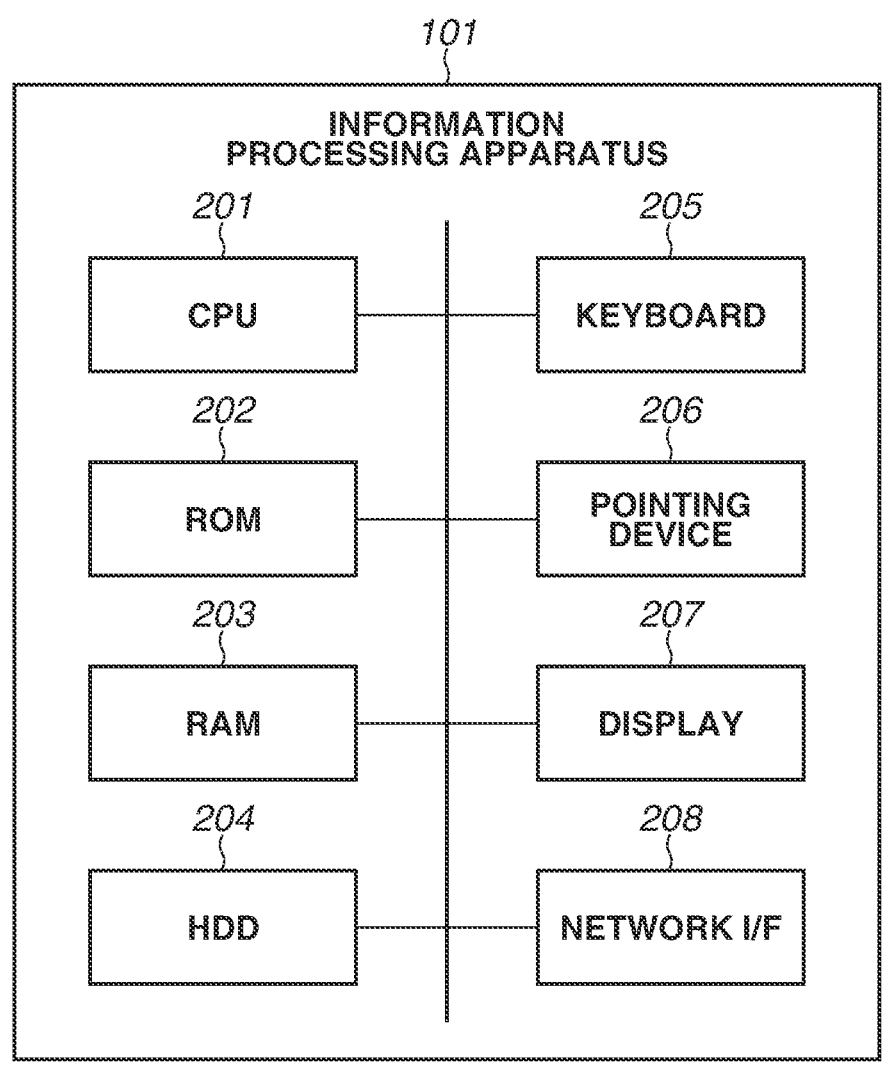
FIG. 2 illustrates a hardware configuration of an information processing apparatus of the present disclosure.

FIG. 2 illustrates a hardware configuration of the information processing apparatus 101. A central processing unit (CPU) 201 reads a control program stored in a read only memory (ROM) 202 and performs various control processing. A random access memory (RAM) 203 is used as the main memory of the CPU 201 and as a temporary storage area of a work area. A hard disk drive (HDD) 204 stores image data and various programs. A keyboard 205, an input apparatus serving as an instruction input unit, is used to input a control command and a text to an application (described below) of the present disclosure. A pointing device 206, an input apparatus serving as an instruction input unit like the keyboard 205, issues a control command to an application (described below) of the present disclosure. A display 207, an output apparatus serving as a display unit, displays and control display of commands input from the keyboard 205 and the pointing device 206 and the status of an application (described below) of the present disclosure. A network I/F 208 connects the information processing apparatus 101 to networks (Local Area Network and the Internet). The information processing apparatus 101 transmits and receives various information to/from other apparatuses on the network by using the network I/F 208.

Figure 3:
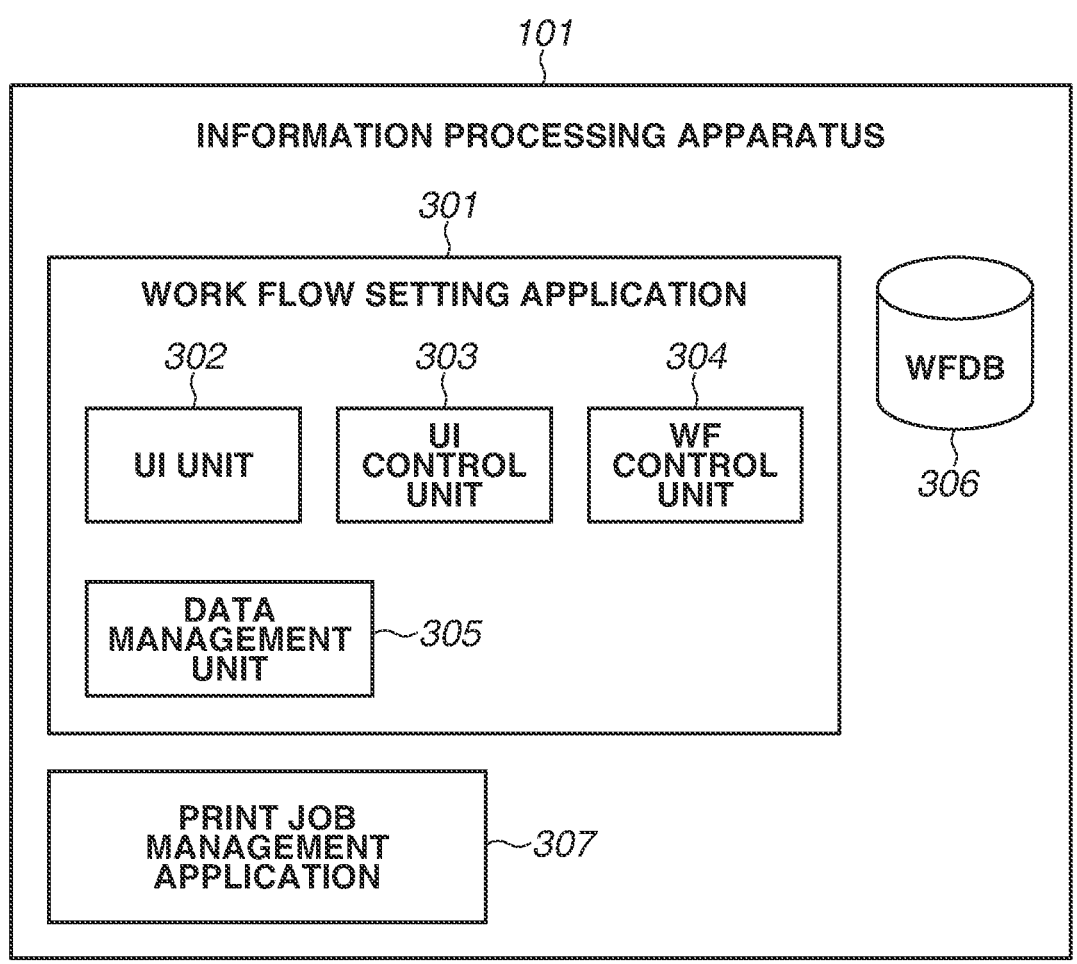
FIG. 3 illustrates a software configuration of the present disclosure.

FIG. 3 illustrates a software configuration of the information processing apparatus 101. A work flow setting application 301 is a program module installed in the information processing apparatus 101, loaded into the RAM 203, and executed by the CPU 201. A user interface (UI) unit 302 configures a graphical user interface (GUI) and issues an instruction for performing processing for various input operations received from a user. A UI control unit 303 generates and displays an assist image (described below) for making it easier for the user to image how each setting is reflected to the final product. A work flow control unit 304 performs various edit processing (generation, editing, and registration of a work flow) of the work flow setting application 301. A data management unit 305 accesses a work flow database (DB) (described below) and refers to various information related to UIs and work flow control. A work flow DB 306 is a database for managing UI and work flow control information (described below). The work flow DB 306 may be configured to store information not only in the HDD 204 of the information processing apparatus 101 but also in another information processing apparatus (such as a database server) connected via a network. A print job management application 307 is a program module installed in the information processing apparatus 101. The print job management application 307 receives orders for print product generation from the user via an ordering system (not illustrated), acquires work flow information registered by the work flow setting application 301 from the work flow DB 306, and generates a print job corresponding to the order. Then, the print job management application 307 transmits the generated print job to a predetermined image forming apparatus 102 and the post-processing apparatus 103. The print job management application 307 and the work flow setting application 301 may be configured as one application. The print job management application 307 and the work flow setting application 301 may be installed in another information processing apparatus 101. The work flow setting application 301 is an application for performing process setting, process order setting, and process setting value setting in pre-print processing (prepress), print processing (press), and post-print processing (postpress).

Figure 16:
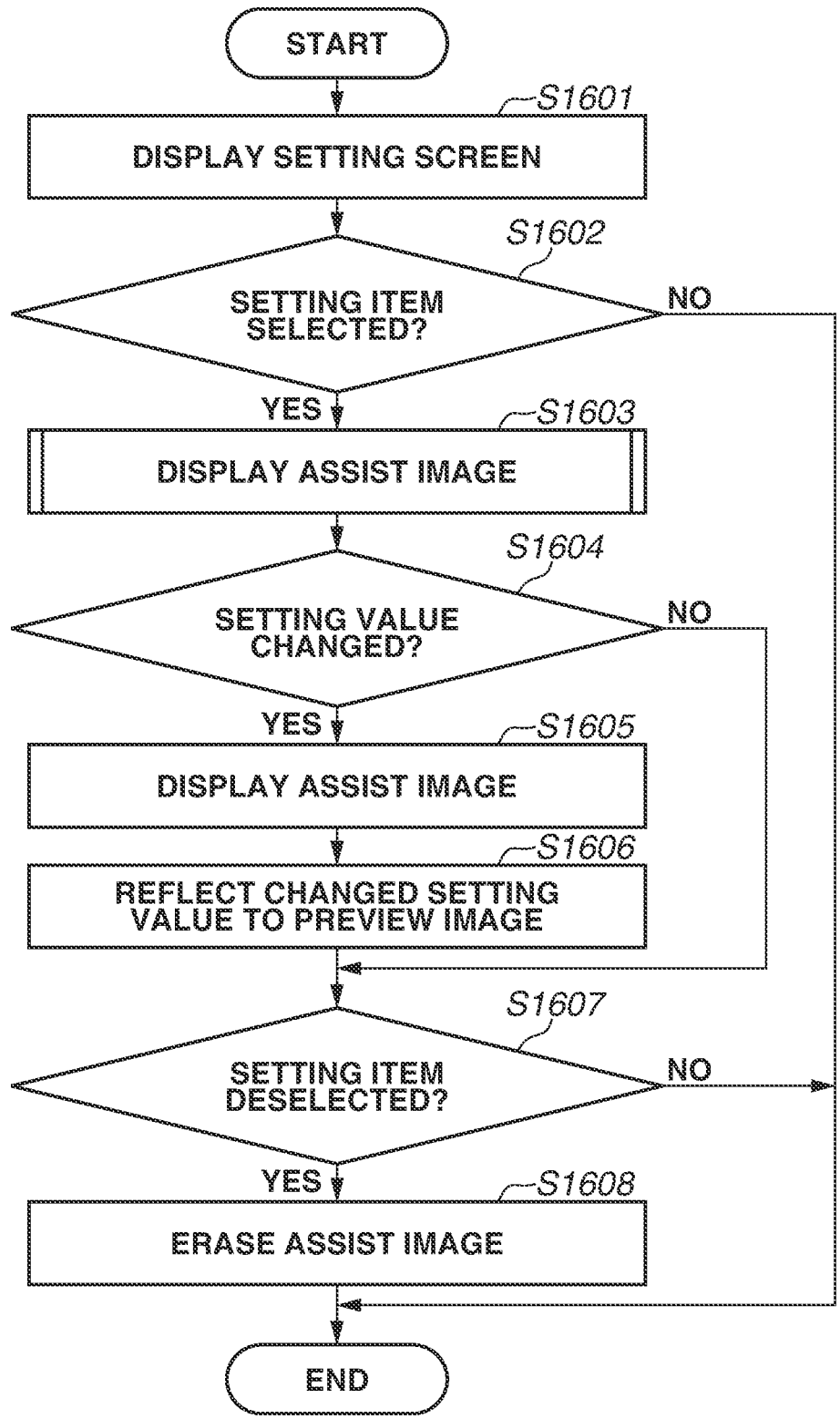
FIG. 16 is a flowchart illustrating UI processing related to work flow generation.

FIG. 16 is a flowchart illustrating UI processing of the work flow setting application 301.

Figure 18:
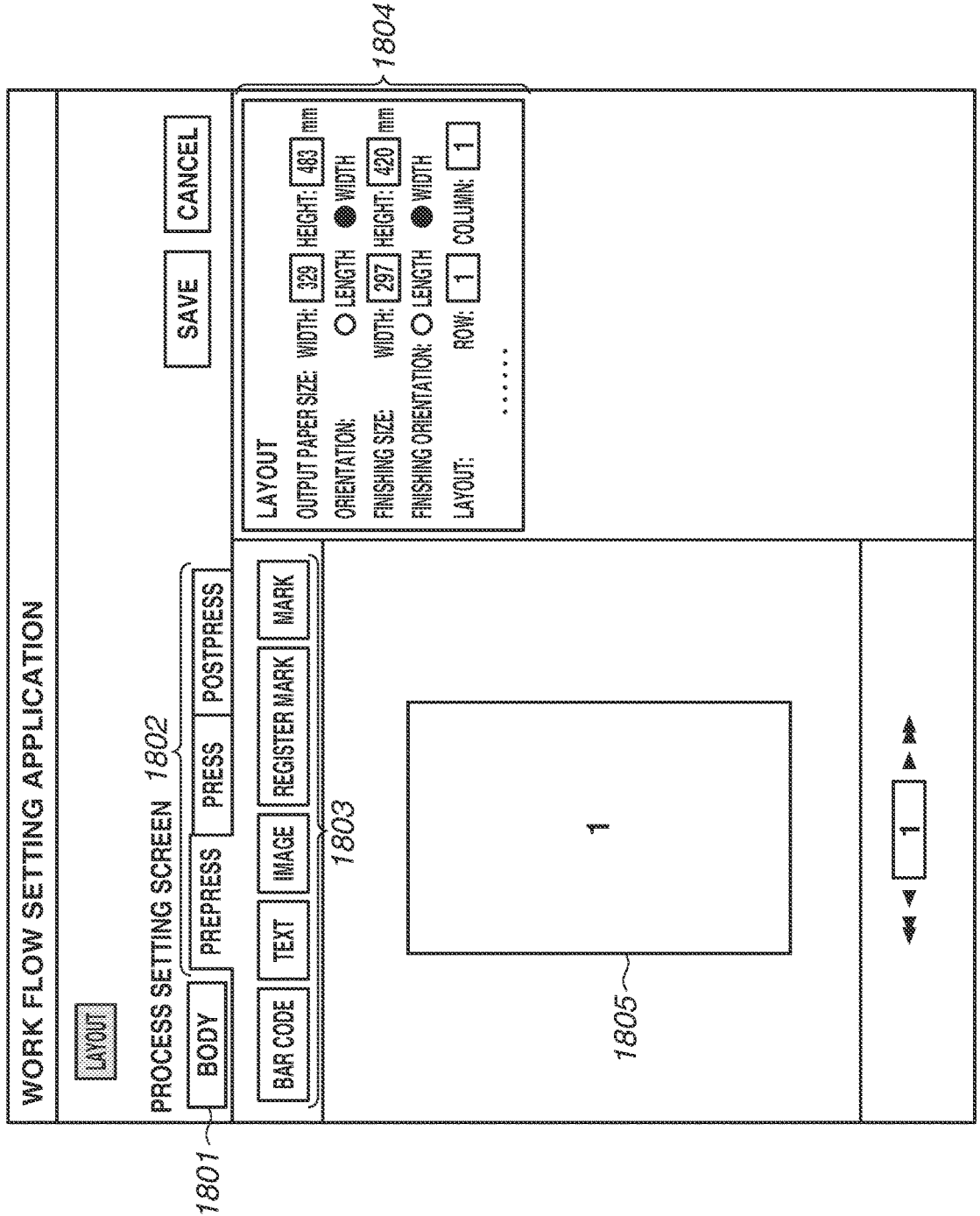
FIG. 18 illustrates an example of a UI for layout setting in a prepress process.

In step S1601, the work flow setting application 301 displays a setting screen. The setting screen is used to perform setting to a plurality of setting items for generating a product. The plurality of setting items relates to the pre-print processing (prepress), print processing (press), and post-print processing (postpress). FIG. 18 illustrates an example of a UI screen for layout setting in the prepress process of the body part. An editing target part 1801 indicates that the body is subjected to editing. Tab controls 1802 are used to specify an editing target process from prepress (layout), press (printing), and postpress (post-processing) as a setting target process in the work flow. The tab controls 1802 indicate a state where prepress is currently being edited. Buttons 1803 are used to set various processes. For prepress, buttons for setting the bar code, text, image, register mark, and mark processes are displayed. Setting controls 1804 are used to perform advanced layout setting.

The present exemplary embodiment is on the premise that, when the setting screen is displayed, default values are already input to the setting items of the setting controls 1804. The default values of setting items of the setting controls 1804 are acquired from a default value information table determined according to each commercial material (part) illustrated in FIG. 6D. The default value information table is stored in the work flow DB 306, read by the data management unit 305, and transferred to the UI unit 302 to be displayed thereon. The UI screen includes a preview image 1805.

Figure 20:
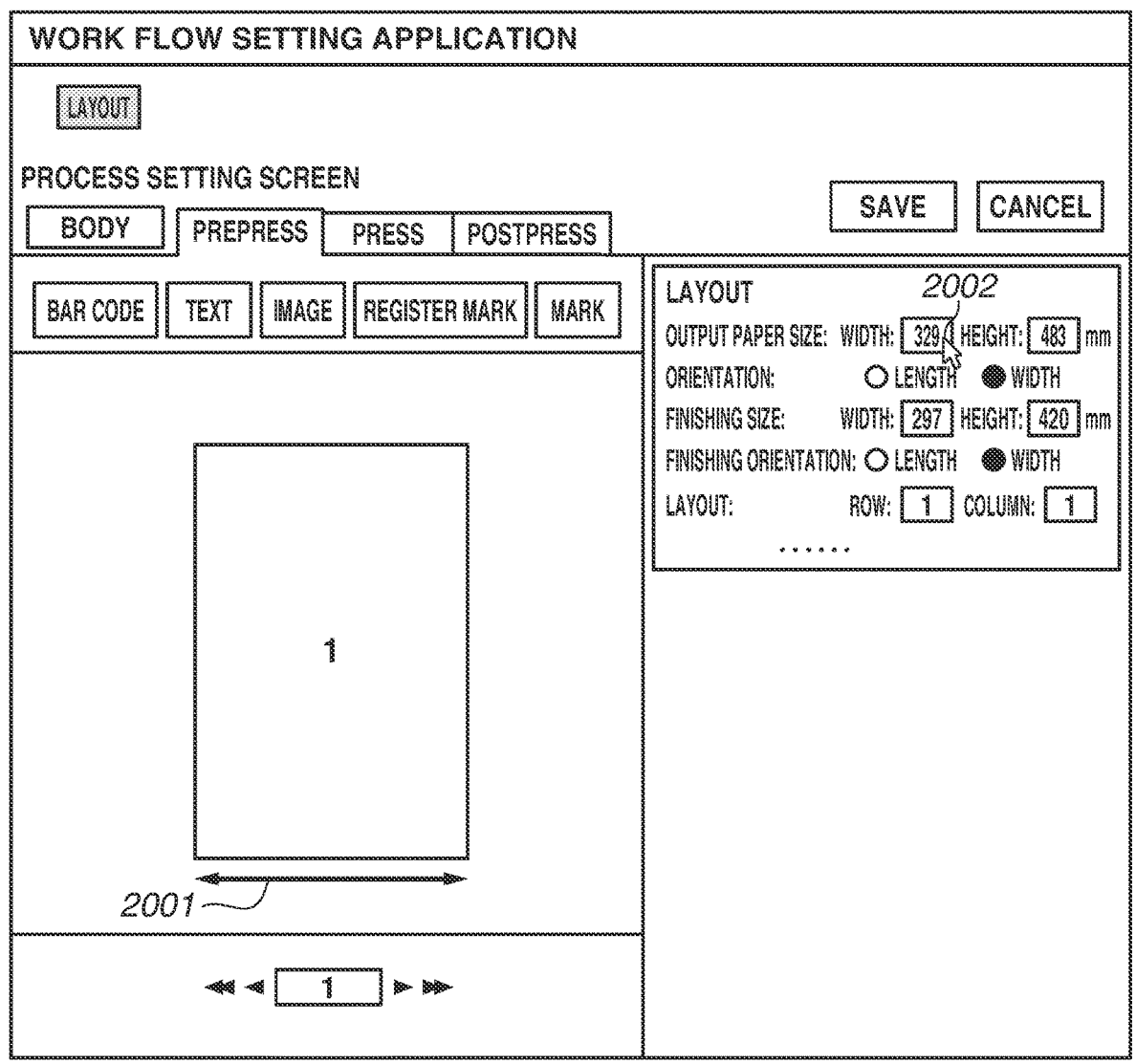
FIG. 20 illustrates an example of a setting screen.

In step S1602, the work flow setting application 301 determines whether the setting item is selected. When the cursor is located in a predetermined range of a setting item or when a setting item is focused, the work flow setting application 301 determines that the setting item is selected. This determination method is to be considered as an example. Alternatively, when one setting item is selected so that input can be made, the work flow setting application 301 may determine that the setting item is selected. Referring to FIG. 20, a cursor 2002 is located on OUTPUT PAPER SIZE (WIDTH), for example. The work flow setting application 301 determines whether the cursor is located on a setting item based on whether the cursor is located on the input box of the setting item or within a predetermined rectangular range around the setting item. If the work flow setting application 301 determines that the setting item is selected (YES in step S1602), the processing proceeds to step S1603. On the other hand, if the work flow setting application 301 does not determine that the setting item is selected (NO in step S1602), the processing exits this flowchart.

In step S1603, the work flow setting application 301 displays an assist image for the setting item. Referring to FIG. 20, for example, an image 2001 is an example of an assist image for the output paper size (width). Any assisting method is applicable as long as the user can recognize the current setting position, for example, with an arrow, line, or coloring, like the present exemplary embodiment. Displaying an assist image for the currently selected setting item enables the user to determine the current setting item. Each step for displaying an assist image will be described below with reference to FIG. 17.

Figure 4:
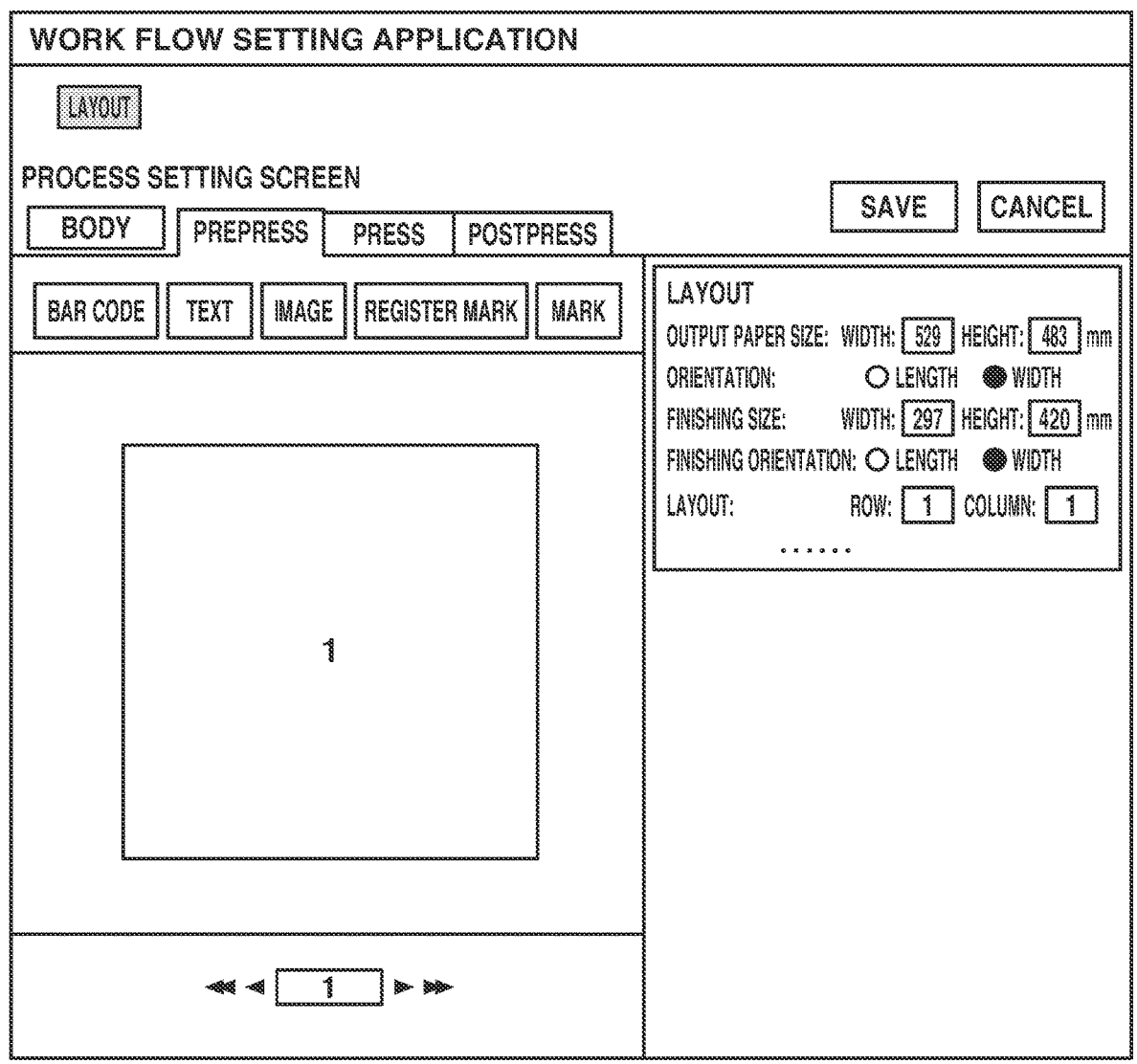
FIG. 4 illustrates an example of a setting screen.

In step S1604, the work flow setting application 301 determines whether the setting value is changed for the currently selected setting item. More specifically, when the user inputs (changes) the setting value, the work flow setting application 301 determines that the setting value is changed. FIG. 4 illustrates is an example 401 where the output paper size (width) is changed from 329 to 529. The changed setting value is stored in the work flow DB 306, the RAM 203, or the HDD 204.

Figure 21:
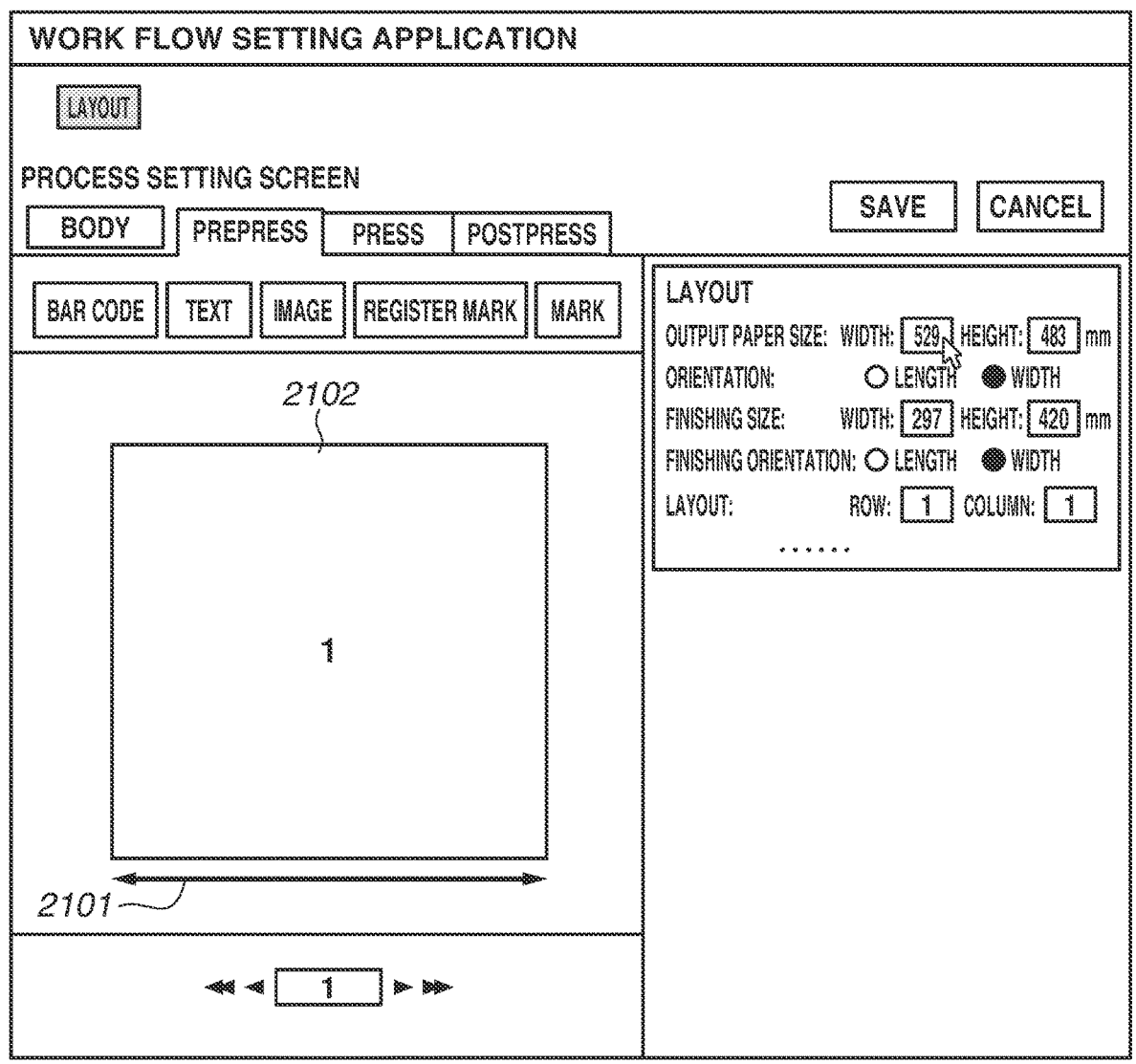
FIG. 21 illustrates another example of the setting screen.

In step S1605, the work flow setting application 301 displays an assist image corresponding to the setting item by using the changed setting value. Each step for displaying an assist image will be described below with reference to FIG. 17. In an assist image 2101 illustrated in FIG. 21, the changed setting value of the output paper size (width), 529, is reflected.

In step S1606, the work flow setting application 301 reflects the changed setting value to the preview image. In a preview 2102 illustrated in FIG. 21, the changed setting value of the output paper size (width), 529, is reflected.

In step S1607, the work flow setting application 301 determines whether the setting item is deselected. If the setting item is not focused or not pointed to by the cursor, the work flow setting application 301 determines that the setting item is deselected. If the work flow setting application 301 determines that the setting item is deselected (YES in step S1607), the processing proceeds to step S1608. On the other hand, if the work flow setting application 301 does not determine that the setting item is deselected (NO in step S1607), the processing exits this flowchart.

In step S1608, the work flow setting application 301 erases the assist image. FIG. 4 illustrates an example of a state where the assist image is erased.

The work flow setting application 301 repeats steps S1602 to S1608 until setting is completed for all setting values. When setting is completed for all setting values, the work flow setting application 301 terminates the processing. Although, in the present exemplary embodiment, the work flow setting application 301 determines that setting is completed for all setting values when the SAVE button is selected, other determination methods may also be employed.

Figure 17:
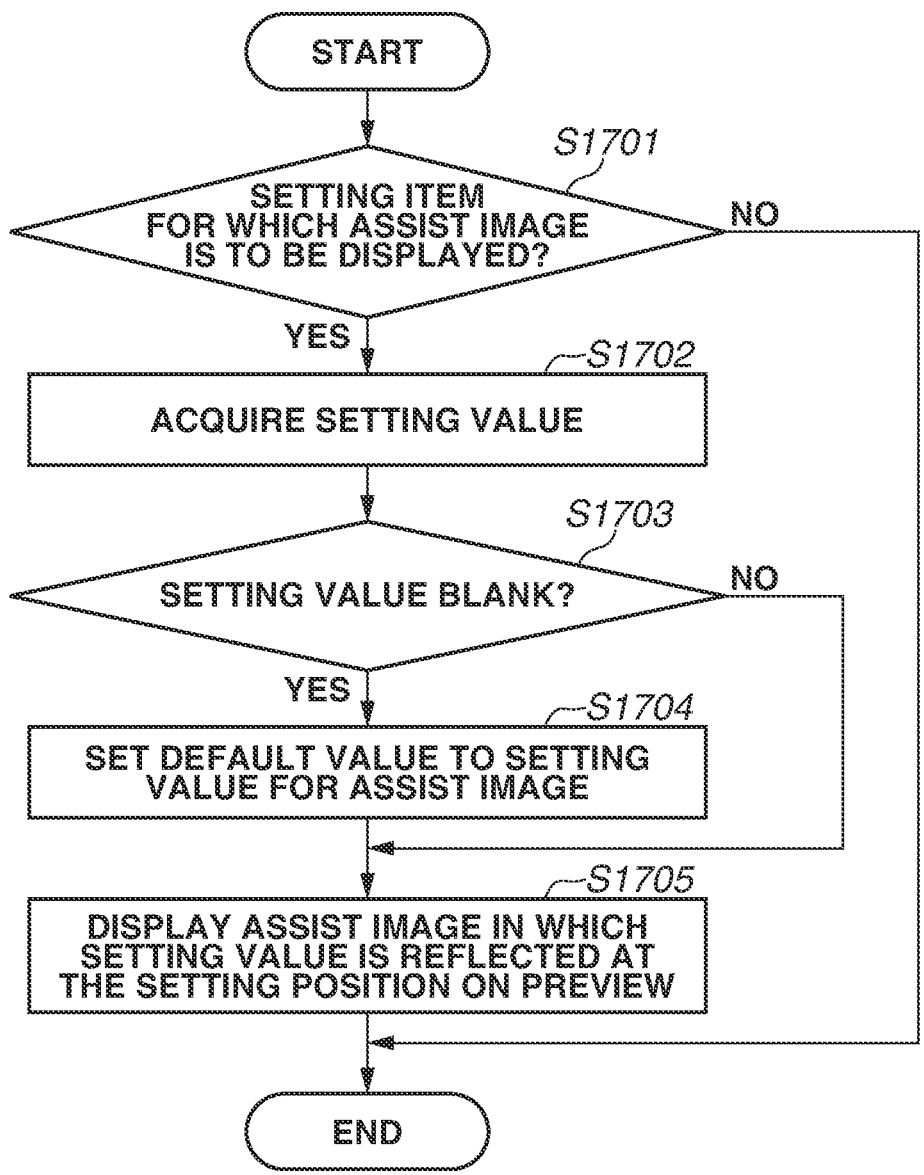
FIG. 17 is a sub flowchart illustrating processing for displaying an assist image.

FIG. 17 is a sub flowchart illustrating processing for displaying an assist image. This sub flowchart corresponds to steps S1603 and S1605 illustrated in FIG. 16.

In step S1701, the work flow setting application 301 determines whether the currently selected setting item is a setting item for which an assist image is to be displayed. If the work flow setting application 301 determines that the selected setting is a setting item for which an assist image is to be displayed (YES in step S1701), the processing proceeds to step S1702. On the other hand, if the work flow setting application 301 does not determine that the selected setting is not a setting item for which an assist image is to be displayed (NO in step S1701), the processing exit this sub flowchart. The work flow setting application 301 determines whether the currently selected setting is a setting item for which an assist image is to be displayed based on an assist image information table determined according to the commercial materials (parts) illustrated in FIG. 6E. The example illustrated in FIG. 6E indicates that the setting items OUTPUT PAPER SIZE (WIDTH), OUTPUT PAPER SIZE (HEIGHT), FINISHING SIZE (WIDTH), and FINISHING SIZE (HEIGHT) are setting items for which assist image is to be displayed. The assist image information table is stored in the work flow DB 306, read by the data management unit 305, and transferred to the UI unit 302 to be used for the determination.

In step S1702, the work flow setting application 301 acquires the setting value of the currently selected setting item. Referring to FIG. 20, the cursor 2002 points to the setting value of the setting item OUTPUT PAPER SIZE (WIDTH), 329, and the work flow setting application 301 acquires this setting value.

In step S1703, the work flow setting application 301 determines whether the setting value of the selected setting item is a blank (setting value is absent). If the work flow setting application 301 determines that the setting value is a blank (YES in step S1703), the processing proceeds to step S1704. In step S1704, the work flow setting application 301 sets the default value as the setting value for the assist image. Then, the processing proceeds to step S1705. On the other hand, if the work flow setting application 301 determines that a setting value is present (NO in step S1703), the processing skips step S1704 and proceeds to step S1705.

In step S1705, the work flow setting application 301 displays an assist image in which the setting value is reflected at the setting position on the preview (page preview image). Referring to FIG. 20, the assist image 2001 reflects the output paper size (width), 329 mm. The length of the arrow changes according to the setting value of the output paper size (width). Any assisting method is applicable as long as the user can recognize the current setting position, for example, with an arrow, line, or coloring, like the present exemplary embodiment. The work flow setting application 301 sets the default value as the setting value of the assist image in step S1704 because the setting value of a blank (setting value is absent) cannot generate an assist image in which the setting value is reflected. Also, by setting the default value, an assist image is displayed even when the setting value is a blank.

According to the present exemplary embodiment, an assist image is displayed separately from the preview image so that the setting item can be identified. The assist image 2001 (arrow image) illustrated in FIG. 20 is an example of an assist image. However, the assist image is not limited to an image of an arrow and may be an image of a line, wavy line, mark, or symbol. A different image may be displayed according to the assist position.

When the user inputs a setting value, the assist image of the setting item is displayed. This makes it easier for the user to recognize which setting of the product the selected setting item corresponds to.

A first modification of the first exemplary embodiment will be described below.

FIGS. 16 and 17 illustrate examples where, when a setting value is changed, the assist image is corrected according to the changed setting value. The first modification will be described below centering on an example where, even when a setting value is changed, an assist image is displayed by using the default setting value.

Figure 22:
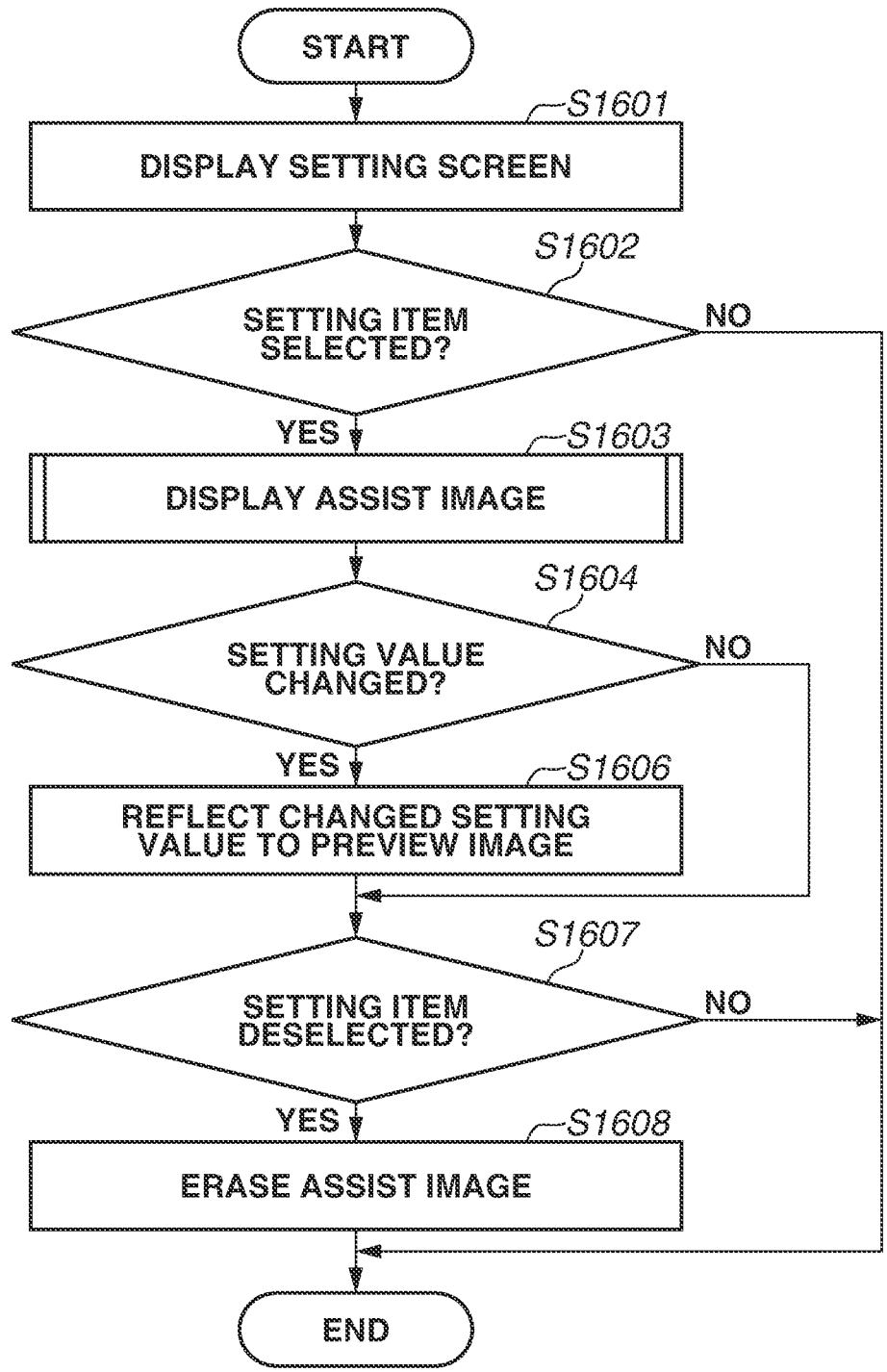
FIG. 22 is a flowchart illustrating UI processing related to work flow generation according to the first modification.

FIG. 22 is a flowchart illustrating UI processing for inputting a setting value. This flowchart differs from the flowchart illustrated in FIG. 16 in that the processing in step S1605 illustrated in FIG. 16 is absent. More specifically, even when the setting value is changed in step S1604 illustrated in FIG. 22, the assist image remains unchanged.

Figure 19:
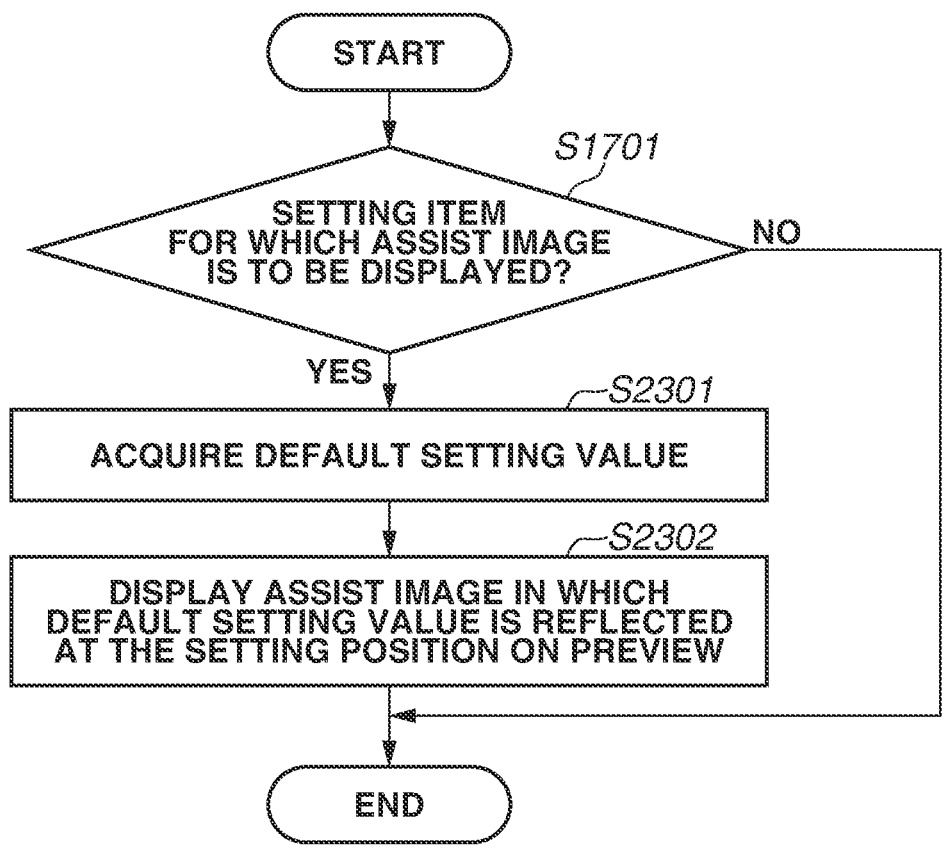
FIG. 19 is a sub flowchart illustrating processing for displaying an assist image according to a first modification.

FIG. 19 is a sub flowchart illustrating processing for displaying an assist image. This sub flowchart corresponds to step S1603 illustrated in FIG. 16.

In step S2301, the work flow setting application 301 acquires the default value of the selected setting item from the default value information table. In step S2302, the work flow setting application 301 displays an assist image in which the default setting value is reflected at the setting position on the preview.

According to a first modification, since an assist image is not corrected and displayed according to the changed setting value, an assist image can be displayed while improving the performance of the UI processing.

A second modification of the first exemplary embodiment will be described below.

FIG. 17 illustrates an example where an assist image displayable in the display area for preview image display is displayed. A second modification will be described below centering on an example where an assist image is displayed in an area different from the display area for preview image display. According to the present modification, a page preview (first preview) is displayed in the display area for preview image display, and an assist image is displayed on an image representing a product from a viewpoint different from the viewpoint of the page.

Figure 5:
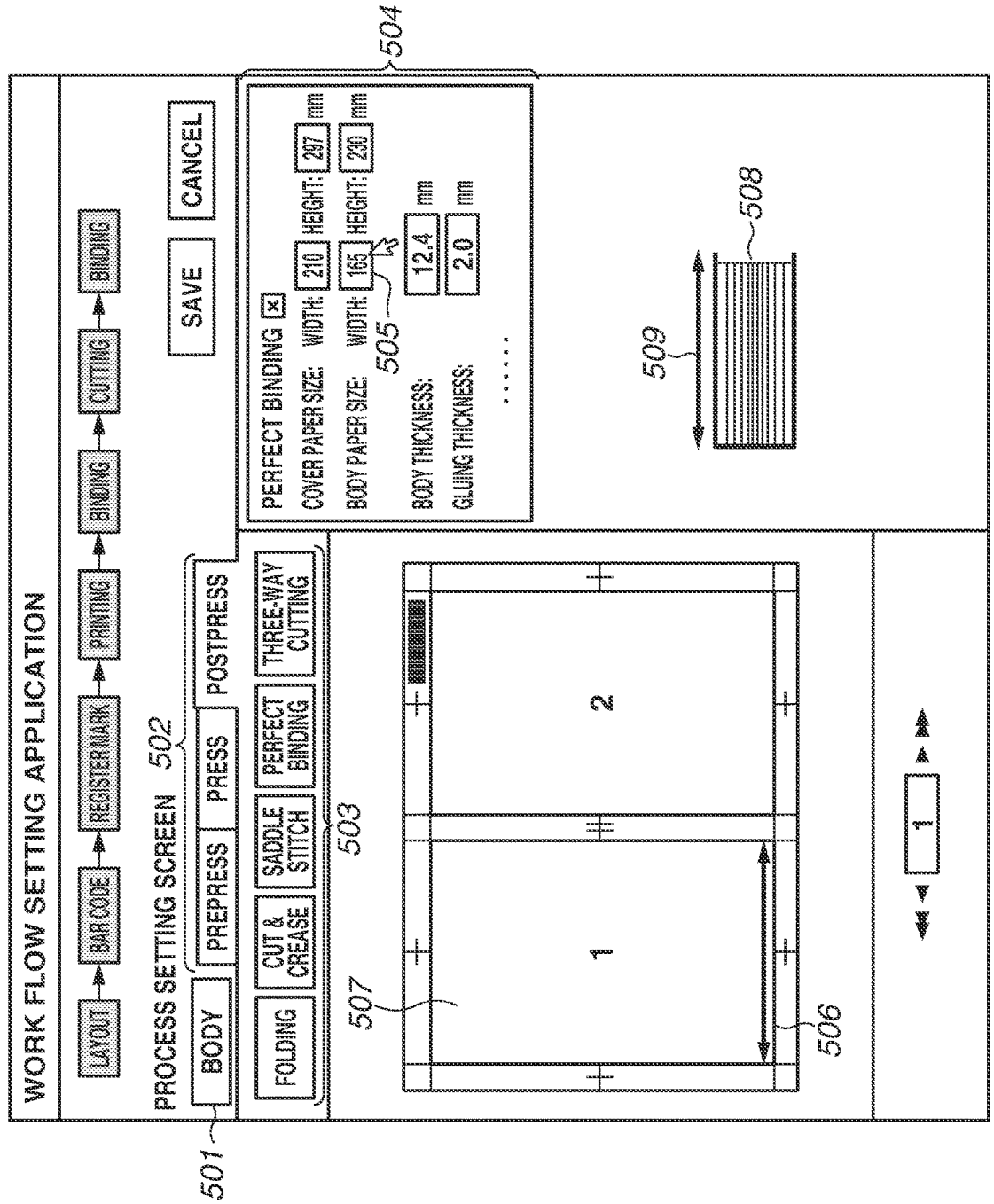
FIG. 5 illustrates an example of a work flow process setting screen.

FIG. 5 illustrates an example of a UI screen for perfect binding setting in the postpress process of the body part. An editing target part 501 indicates that the body is subjected to editing. Tab controls 502 are used to specify an editing target process from prepress (layout), press (printing), and postpress (post-processing) as a setting target process in the work flow. The tab controls 502 indicate a state where postpress is currently being edited. Buttons 503 are used to set various processes. For postpress, buttons for setting the folding, cut & crease, saddle stitch, perfect binding, and three-way cutting processes are displayed. Setting controls 504 are used to perform advanced perfect binding setting. Default values of setting items of the setting controls 1804 are acquired from a default value information table determined according to each commercial material (part) illustrated in FIG. 6A. The default value information table is stored in the work flow DB 306, read by the data management unit 305, and transferred to the UT unit 302. FIG. 6B illustrates an assist image information table indicating whether each setting item is a setting item for which an assist image is to be displayed. This table is determined according to each commercial material (part).

Figure 7:
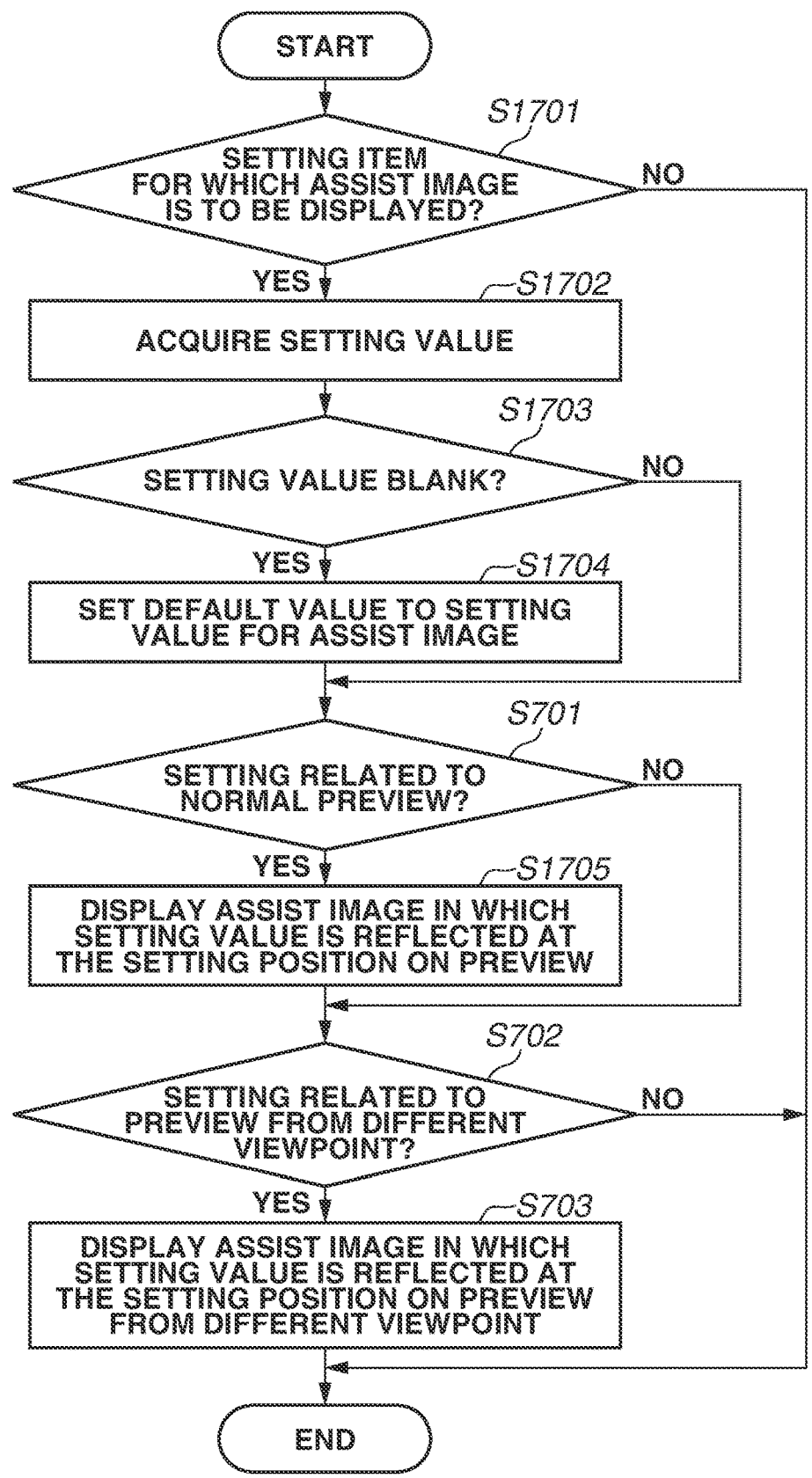
FIG. 7 is a sub flowchart illustrating processing for displaying an assist image according to a second modification.

FIG. 7 is a sub flowchart illustrating processing for displaying an assist image according to the second modification. Steps other than steps S701 to S703 are similar to steps illustrated in FIG. 17. Steps similar to steps illustrated in FIG. 17 are assigned the same reference numerals, and redundant descriptions thereof will be omitted.

In step S701, the work flow setting application 301 determines whether the item pointed to and selected by the cursor relates to the normal preview (page preview and first preview). The normal preview (page preview) is equivalent to a preview 507 illustrated in FIG. 5. When the work flow setting application 301 determines that the selected item relates to the normal preview (YES in step S701), the processing proceeds to step S1705. On the other hand, when the work flow setting application 301 determines that the selected item does not relate to the normal preview (NO in step S701), the processing proceeds to step S702.

In step S702, the work flow setting application 301 determines whether the item pointed to and selected by the cursor is a setting related to a preview from a different viewpoint. A preview 508 illustrated in FIG. 5 is an example of a preview from a different viewpoint (second preview). For example, the preview 508 is a preview from a viewpoint at which effects of the settings of the body thickness and gluing thickness are recognizable for a product with the perfect binding setting in the postpress process of the body part. A preview from a different viewpoint is prepared for each setting value according to each commercial material (part) and prestored in the work flow DB 306. If the work flow setting application 301 determines that the selected item is a setting related to a preview from a different viewpoint (YES in step S702), the processing proceeds to step S703. On the other hand, if the work flow setting application 301 determines that the selected item is not a setting related to a preview from a different viewpoint (NO in step S702), the processing exits this flowchart.

The work flow setting application 301 determines whether the item pointed to and selected by the cursor is a setting related to the normal preview or a setting related to a preview from a different viewpoint in steps S701 and S702, based on the preview information table determined according to each commercial material (part) illustrated in FIG. 6C. The preview information table is stored in the work flow DB 306, read by the data management unit 305, and transferred to the UI unit 302 to be displayed thereon. Referring to FIG. 6C, the preview information table indicates that the body paper size (height) relates only to the normal preview, and the gluing thickness relates only to a preview from a different viewpoint. The preview information table also indicates that the body thickness relates to both the normal preview and a preview from a different viewpoint.

In step S703, the work flow setting application 301 displays an assist image in which the setting value is reflected at the setting position on a preview from a different viewpoint. In an assist image 509 illustrated in FIG. 5, the body paper size (width) 165 mm is reflected. The length of the arrow changes reflecting the magnitude of the setting value. Any assisting method is applicable as long as the user can recognize the current setting position, for example, with an arrow, line, or coloring, like the present exemplary embodiment.

The body paper size (width) relates to both the normal preview (page preview) and a preview from a different viewpoint like the present exemplary embodiment. Therefore, an assist image is displayed in both previews as the assist images 506 and 509.

In contrast, some setting items relate to either one of the normal preview and a preview from a different viewpoint.

For example, the gluing thickness is one of such setting items.

Figure 9:
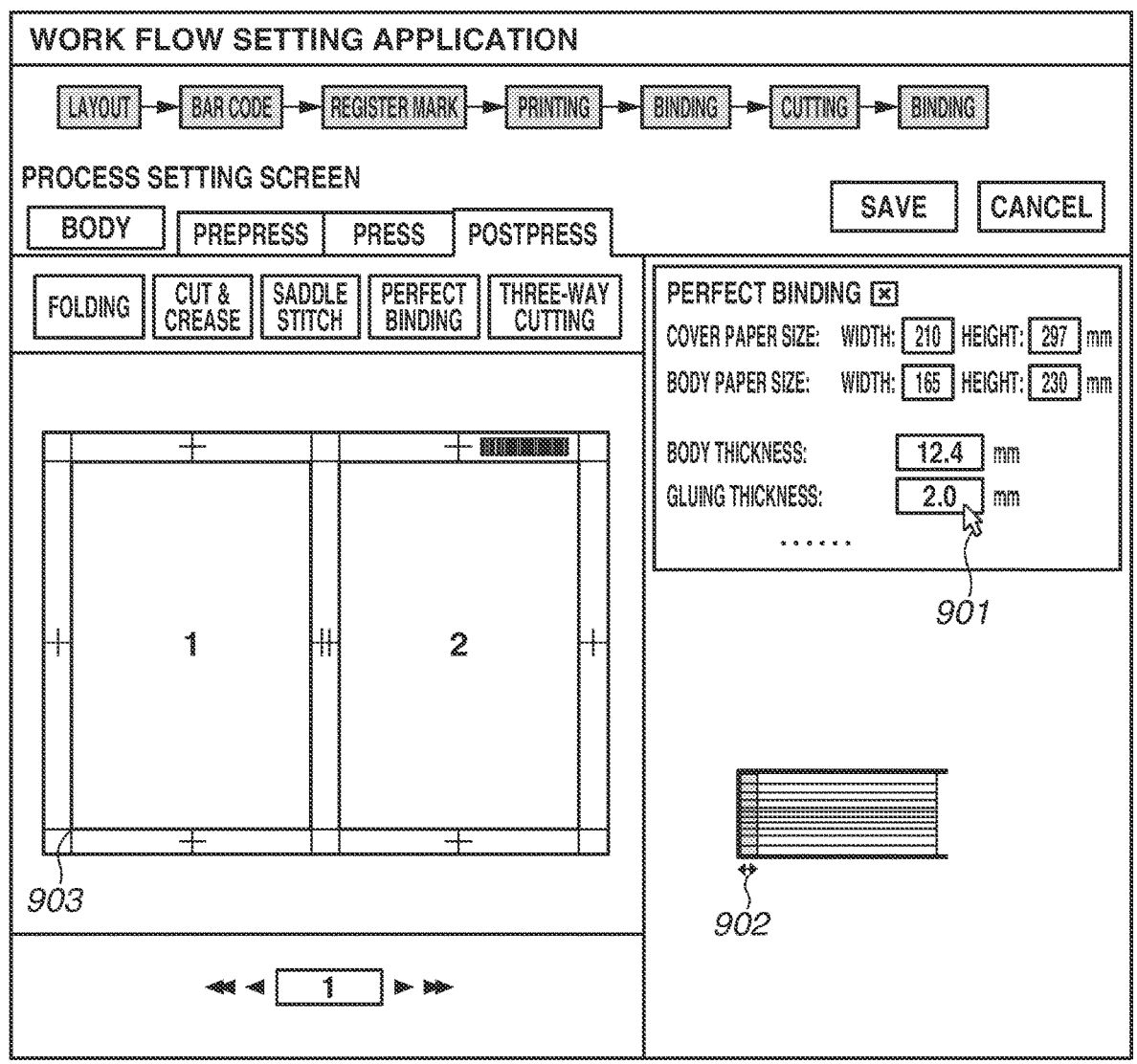
FIG. 9 illustrates an example of a user interface (UI) at the time of perfect binding setting in a postpress process.

FIG. 9 illustrates a screen displayed when the setting item PASTING THICKNESS is selected. Referring to FIG. 9, the gluing thickness is set by the setting item at a cursor 901. FIG. 9 illustrates a UI at the time of perfect binding setting in the postpress process of the body part. The gluing thickness does not appear in the normal preview. In a preview from a different viewpoint, the gluing thickness can be displayed like an assist image 902, enabling the user to recognize how the setting value is reflected. Adding an assist image from a different viewpoint in this way makes it easier for the user to image how the setting value is reflected to a product.

A register mark position is a setting item which does not appear in a preview from a different viewpoint but appears only in the normal preview. This mark position indicates the position for cutting with a setting value (not illustrated) set in the prepress process. A register mark appears like an image 903 in the normal preview enabling the user to image a product but does not appear in a preview from a different viewpoint.

In the above-described example, an assist image is displayed in a preview image from a different viewpoint. Alternatively, an assist image may be displayed in an icon image from a different viewpoint, instead of a preview image from a different viewpoint. More specifically, if the product is a book, an assist image is added to the book to enable the user to grasp the setting position to the product. In addition, if the setting value cannot be expressed in the normal preview image, an assist image may be displayed only in an image from a different viewpoint.

In this way, by displaying an image from a different viewpoint in addition to the normal preview image and displaying an assist image with the setting value reflected in both images, it becomes easier for the user to recognize how the setting value is reflected to the final product.

Figure 14:
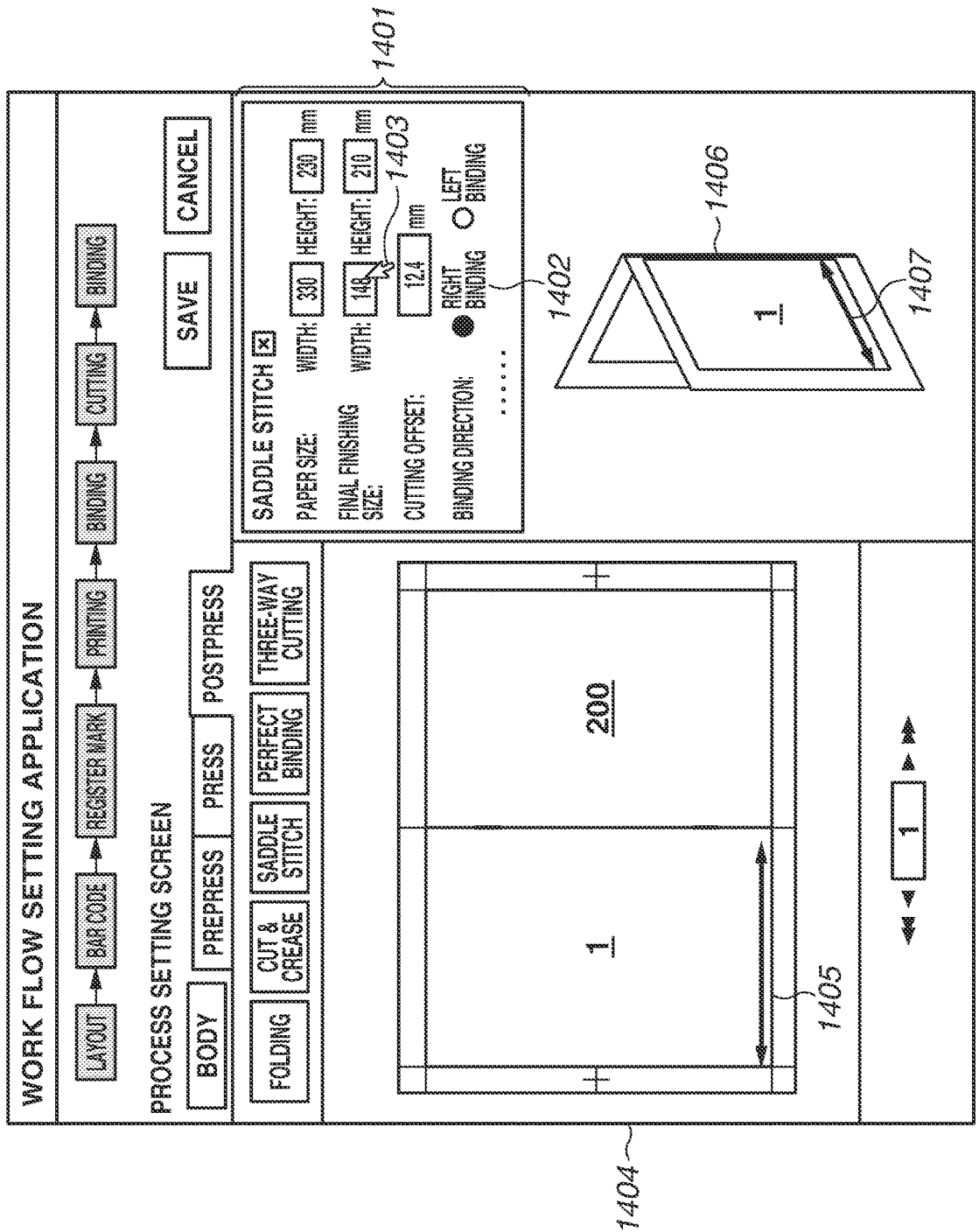
FIG. 14 illustrates an example of a UI screen for right binding of a saddle stitch setting in the postpress process.
Figure 15:
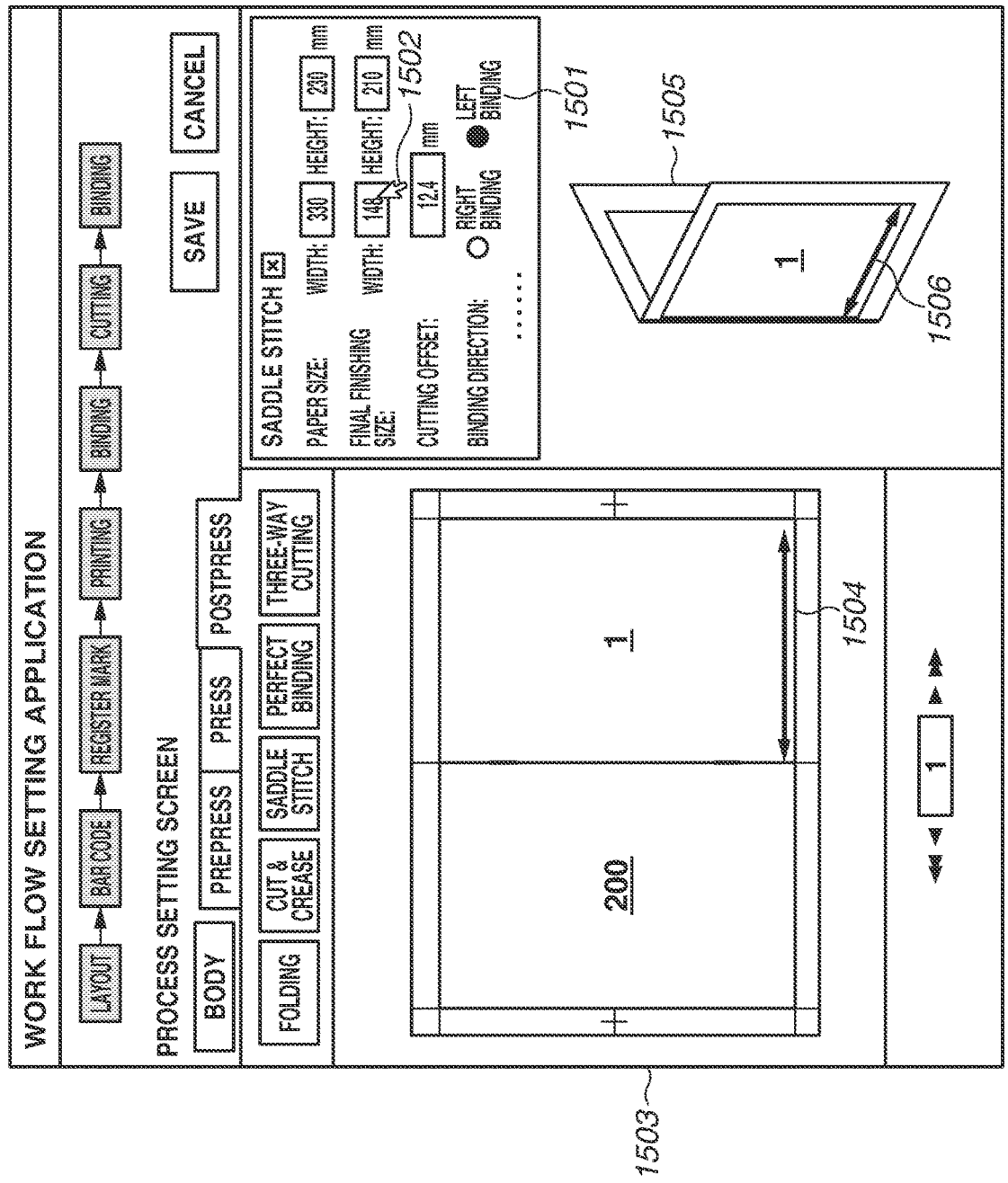
FIG. 15 illustrates an example of a UI screen for left binding of a saddle stitch setting in the postpress process.

Other examples of previews from a different viewpoint are illustrated in FIGS. 14 and 15. In this example, the final finishing size (width) is used as a setting item. The final finishing size (width) is a setting item related to the normal preview and also is a setting item related to a preview from a different viewpoint.

FIG. 14 illustrates an example of a UI screen of saddle stitch setting (right binding) in the postpress process of the body part. Setting controls 1401 are used to perform advanced saddle stitch setting. A button 1402 indicates that the right binding setting is selected as the binding direction. A cursor 1403 is located on the setting item FINAL FINISHING SIZE (WIDTH).

An image 1404 is an example of a normal preview. The right binding being set, the left page is the first page (page 1) and the right page is the last page (page 200 in this example). An image 1405 is an example of an assist image on the normal preview of the final finishing size (width). An image 1406 is an example of a preview from a different viewpoint, and an image 1407 is an example of an assist image on the preview from a different viewpoint for the final finishing size (width).

FIG. 15 illustrates an example of a UI screen of saddle stitch setting (left binding) in the postpress process of the body part. A button 1501 indicates that the left binding setting is selected as the binding direction. A cursor 1502 is located on the setting item FINAL FINISHING SIZE (WIDTH). An image 1503 is an example of a normal preview. The left binding being set, the right page is the first page (page 1) and the left page is the last page (page 200 in this example) in contrary to the case of the right binding (the preview 1404). An image 1504 is an example of an assist image on the normal preview of the final finishing size (width). An image 1505 is an example of a preview from a different viewpoint for the left binding in a different direction from the right binding (the image 1407). An image 1506 is an example of an assist image on a preview from a different viewpoint with the final finishing size (width). A preview from a different viewpoint makes it possible to display a preview closer to the product according to a setting, enabling the user to image how the setting is set to the product. A preview from a different viewpoint is prepared for each setting value according to each commercial material (part) and prestored in the work flow DB 306.

A third modification of the first exemplary embodiment will be described below.

The third modification will be described below centering on processing for displaying a preview of a plurality of parts related to the commercial material type and displaying an assist image of each setting.

Figure 8:
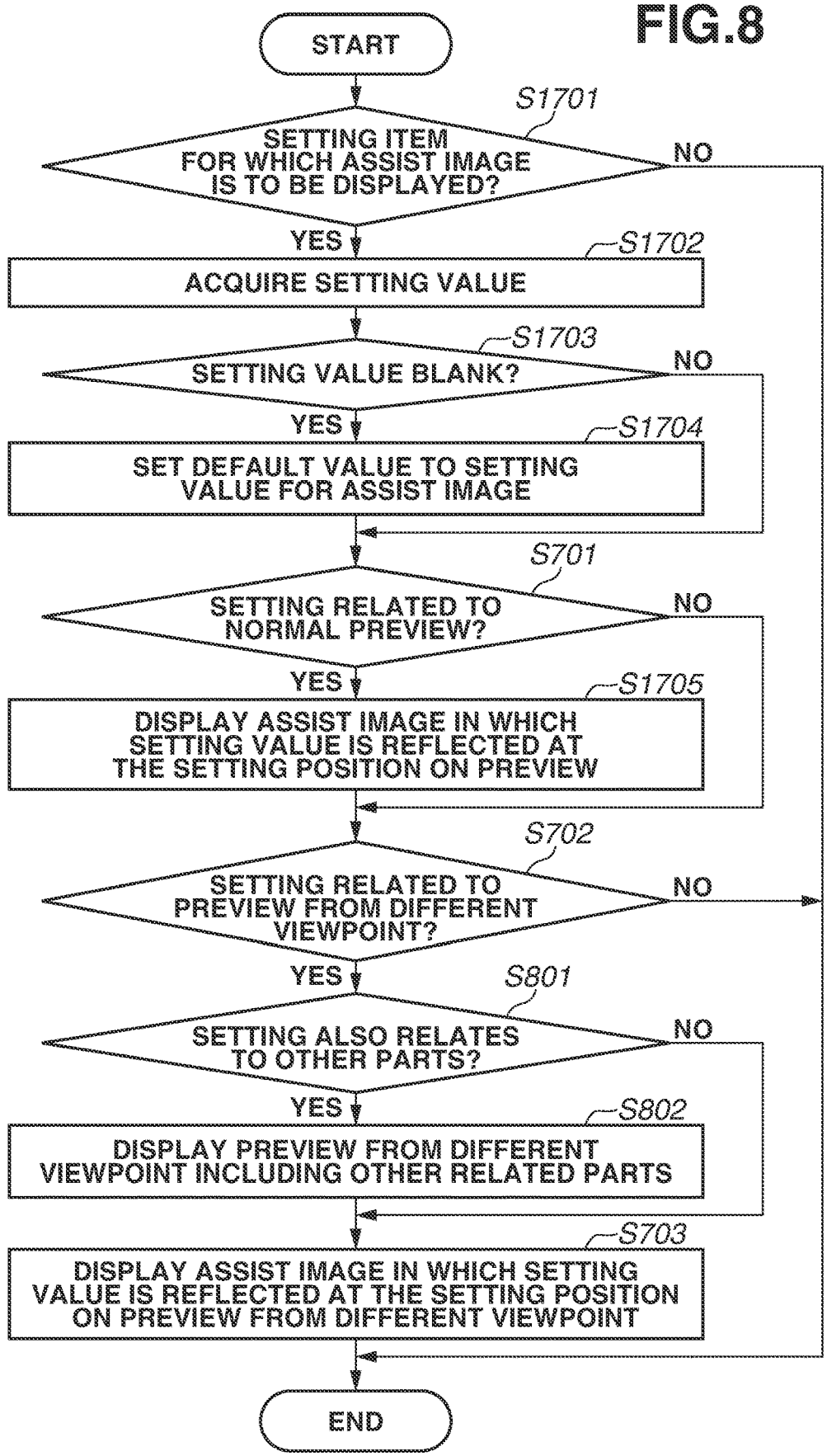
FIG. 8 is a sub flowchart illustrating processing for displaying an assist image according to a third modification.

FIG. 8 is a sub flowchart illustrating processing for displaying an assist image according to the third modification. Steps other than steps S801 and S802 are similar to steps illustrated in FIGS. 7 and 17. Steps similar to steps illustrated in FIGS. 7 and 17 are assigned the same reference numerals, and redundant descriptions thereof will be omitted.

In step S801, the work flow setting application 301 determines whether the setting also relates to other parts. When the work flow setting application 301 determines that the setting also relates to other parts (YES in step S801), the processing proceeds to step S802. On the other hand, the work flow setting application 301 determines that the setting does not relate to other parts (NO in step S801), the processing proceeds to step S703.

Determination as to whether the setting relates to other parts can be determined based on the related part information table determined according to the setting for each part illustrated in FIG. 10. FIG. 10 illustrates the related part information table for each setting value of folding setting in the postpress process of the jacket part and book commercial materials. For example, BASE POINT OF CUT BLOCK: X1 relates no other parts, and CREASE 1: X2 relates to the body, cover, title page, and book band parts.

Figure 11:
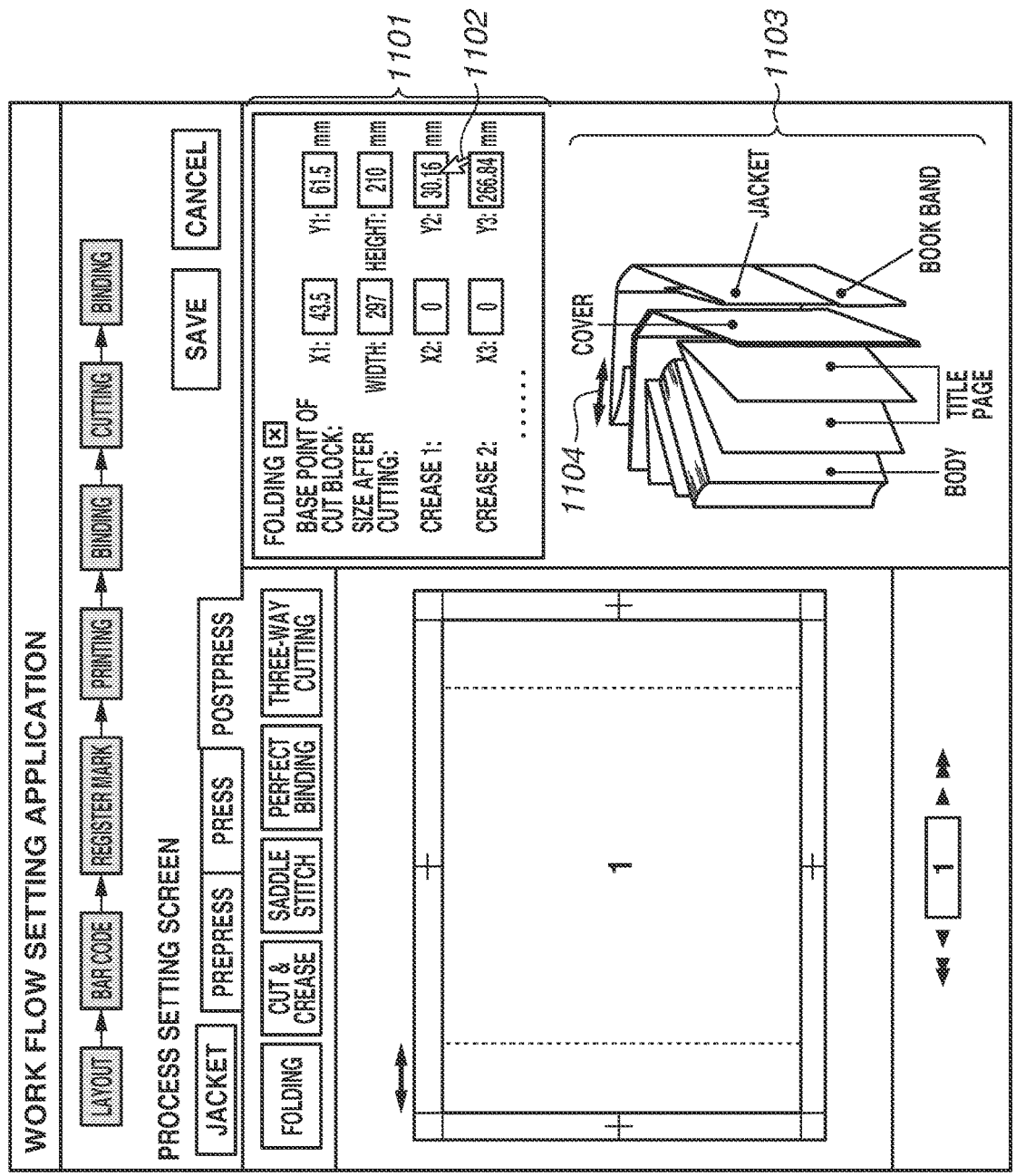
FIG. 11 illustrates an example of a postpress process setting screen.

FIG. 11 illustrates an example case where the setting pointed to by the cursor also relates to other parts. In the folding setting in the postpress process of the jacket part, a setting control 1101 is used to perform advanced folding setting. A cursor 1102 is located on CREASE 1: Y2 (FOLDING).

Y2 of crease 1 indicates the folding width of the jacket. Collectively displaying related parts such as the body, title page, cover, and book band in this way makes it easier for the user to image the effect of the setting. The related part information table illustrated in FIG. 10 describes that Y2 of crease 1 relates to the body, cover, title page, and book band parts. An image 1103 is an example of an assist image where the related body, title page, cover, and book band parts are displayed together with the jacket part. An image 1104 is an assist image of Y2 of crease 1 which enables the user to image the effect of the setting on the final product.

Figure 12:
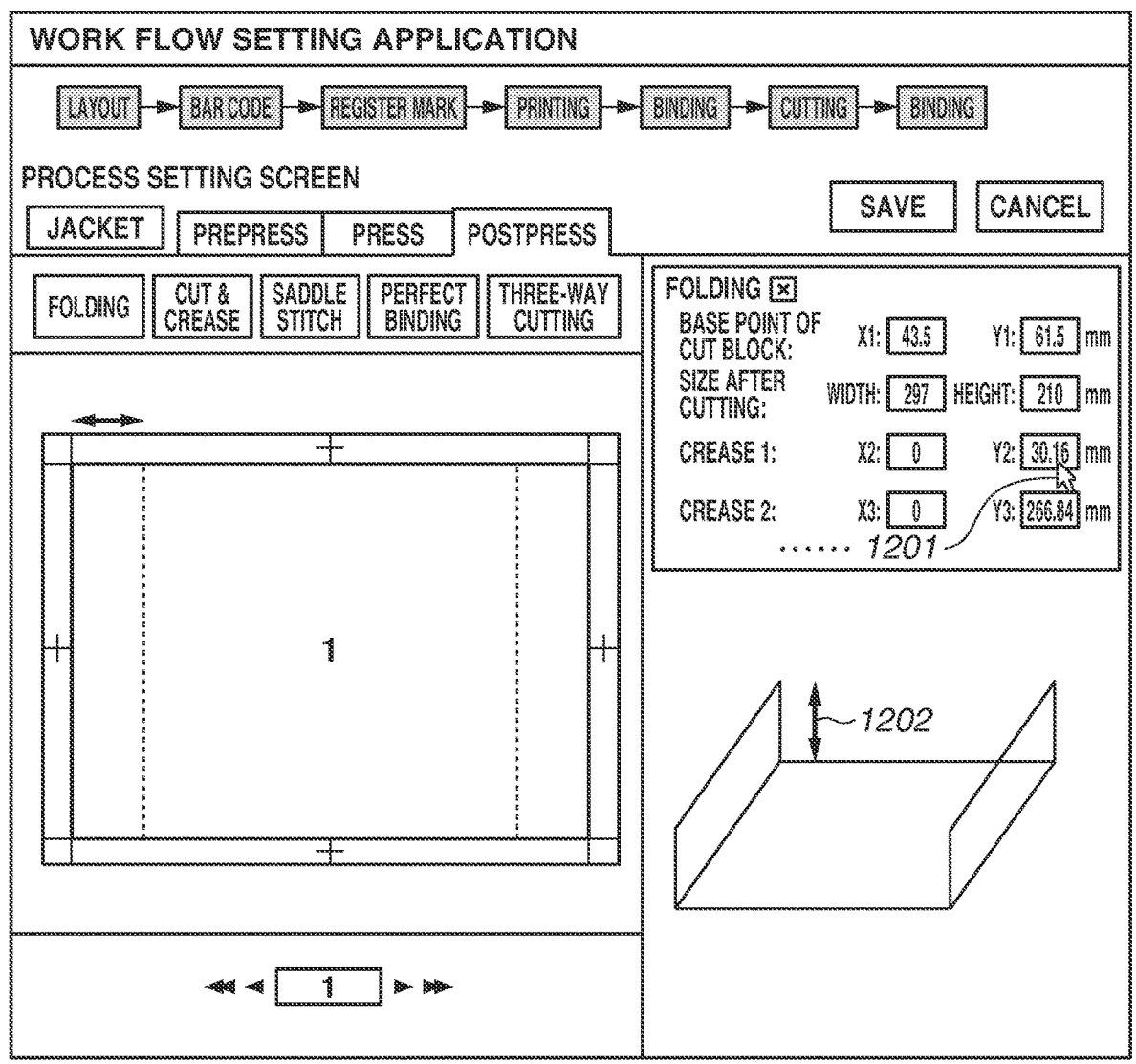
FIG. 12 illustrates another example of the postpress process setting screen.

An image 1202 illustrated in FIG. 12 is an example of an assist image where only the jacket part is displayed and related parts are not in a preview from a different viewpoint. With this assist image, the final product is hard to image.

Figure 13:
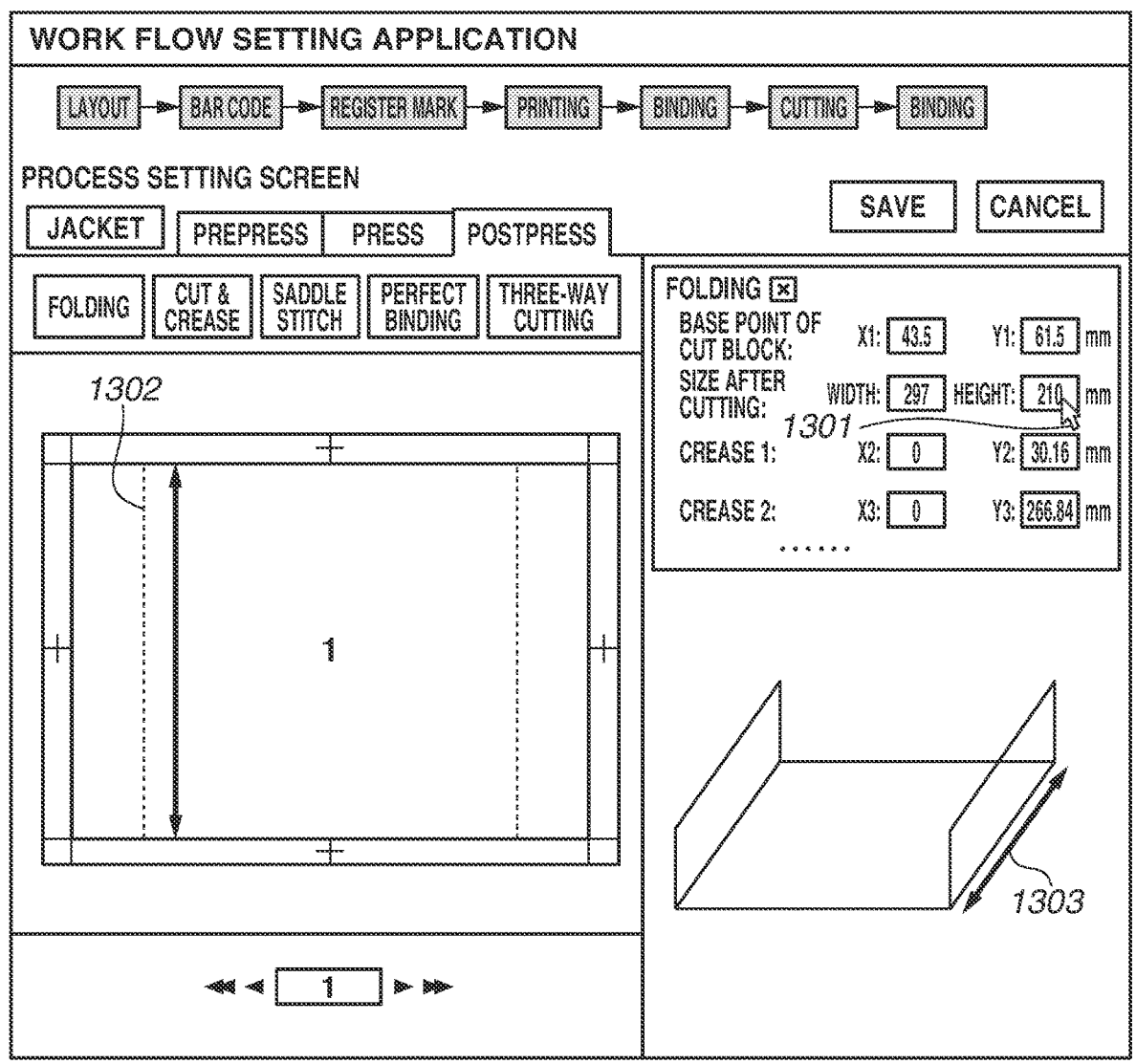
FIG. 13 illustrates still another example of the postpress process setting screen.

FIG. 13 illustrates an example where the cursor is located on HEIGHT for SIZE AFTER CUTTING in a case where the setting does not relate to other parts. An image 1303 indicates an assist image of only the jacket part in a preview from a different viewpoint. For the height of the size after cutting, only a preview of the jacket part from a different viewpoint enables the user to easily image how the setting is reflected to the final product.

Although, according to the present exemplary embodiment, a preview of the target part from a different viewpoint is displayed with or without other related parts, the preview may constantly display both the target part and related parts.

According to the above-described exemplary embodiment, when inputting a setting value in a preview of the setting screen, it is made easier for the user to recognize which setting value corresponds to which setting in the product, by providing an assist image for the setting position.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-205870, filed Oct. 31, 2018, which is hereby incorporated by reference herein in its entirety.

What is claimed is:

1. An information processing apparatus comprising:
   at least one memory; and
   at least one processor, wherein when executing a program stored in the at least one memory, the at least one processor causes the information processing apparatus to operate as:
   a selection unit configured to select one setting item from a plurality of setting items, each of the plurality of setting items being a setting item for setting a respective length to be used for generating a product; and
   a display control unit configured to control contents of a setting screen to be displayed for setting the plurality of setting items,
   wherein the setting screen is controlled to display a first image related to the product and a second image representing the product from a viewpoint different from the viewpoint in the first image,
   wherein the setting screen is controlled to display a first assist image that by its position relative to the first image related to the product is able to assist a user in recognizing the part of the product whose length is to be set by the selected setting item and a second assist image that by its position relative to the second image related to the product is able to assist a user in recognizing the part of the product whose length is to be set by the selected setting item, and
   wherein the setting screen is controlled to not display a first assist image for assisting a user in recognizing the part of the product whose length is to be set by a setting item, for any of the setting items of the plurality of setting items that are not currently selected.

2. The information processing apparatus according to claim 1, wherein a setting item for setting a length to be used for generating the product is at least one of a width of a paper size, a height of the paper size, a width of a finishing size, a height of the finishing size, a body thickness, a gluing thickness, or a folding width.

3. The information processing apparatus according to claim 2, wherein in a case where the setting item for setting the length to be used for generating the product is the height or the width of the paper size, the assist image is an image for recognizing a height or a width of the product and is displayed at a position based on the height or the width of the product on a page preview image of the product.

4. The information processing apparatus according to claim 2, wherein in a case where the setting item for setting the length to be used for generating the product is the height or the width of the finishing size, the assist image is an image for recognizing a height or a width of a finishing size of the product and is displayed at a position based on the height or the width of the finishing size of the product on a page preview image of the product.

5. The information processing apparatus according to claim 2, wherein in a case where the setting item for setting the length to be used for generating the product is the body thickness, the assist image is an image for recognizing a body thickness of the product and is displayed at a position based on the body thickness of the product on an image related to the product.

6. The information processing apparatus according to claim 1, wherein even in a case where a setting value of the selected setting item is not input, the display control unit displays the assist image for assisting a user in recognizing the part of the product whose length is to be set by the selected setting item, on the image related to the product.

7. A method for controlling an information processing apparatus, the method comprising:
   selecting one setting item from a plurality of setting items, each of the plurality of setting items being a setting item for setting a respective length to be used for generating a product; and
   controlling contents of a setting screen to be displayed for setting the plurality of setting items,
   wherein the setting screen is controlled to display a first image related to the product and a second image representing the product from a viewpoint different from the viewpoint in the first image,
   wherein the setting screen is controlled to display a first assist image that by its position relative to the first image related to the product is able to assist a user in recognizing the part of the product whose length is to be set by the selected setting item and a second assist image that by its position relative to the second image related to the product is able to assist a user in recognizing the part of the product whose length is to be set by the selected setting item, and
   wherein the setting screen is controlled to not display a first assist image for assisting a user in recognizing the part of the product whose length is to be set by a setting item, for any of the setting items of the plurality of setting items that are not currently selected.

8. The method according to claim 7, wherein a setting item for setting a length to be used for generating the product is at least one of a width of a paper size, a height of the paper size, a width of a finishing size, a height of the finishing size, a body thickness, a gluing thickness, or a folding width.

9. The method according to claim 7, wherein even in a case where a setting value of the selected setting item is not input, the assist image for assisting a user in recognizing the part of the product whose length is to be set by the selected setting item, is displayed on the image related to the product.

10. A non-transitory computer-readable medium storing a program for causing a computer to implement:
- a selection unit configured to select one setting item from a plurality of setting items, each of the plurality of setting items being a setting item for setting a respective length to be used for generating a product; and
- a display control unit configured to control contents of a setting screen to be displayed for setting the plurality of setting items,
- wherein the setting screen is controlled to display a first image related to the product and a second image representing the product from a viewpoint different from the viewpoint in the first image,
- wherein the setting screen is controlled to display a first assist image that by its position relative to the first image related to the product is able to assist a user in recognizing the part of the product whose length is to be set by the selected setting item and a second assist image that by its position relative to the second image related to the product is able to assist a user in recognizing the part of the product whose length is to be set by the selected setting item, and
- wherein the setting screen is controlled to not display a first assist image for assisting a user in recognizing the part of the product whose length is to be set by a setting item, for any of the setting items of the plurality of setting items that are not currently selected.

* * * * *